United States Patent [19]

Hanway

[11] Patent Number: 4,853,856
[45] Date of Patent: Aug. 1, 1989

[54] VEHICLE MOTION LOGGER

[75] Inventor: John R. Hanway, Fairmont, W. Va.

[73] Assignee: United Engineering Corporation, Fairmont, W. Va.

[21] Appl. No.: 803,531

[22] Filed: Dec. 2, 1985

[51] Int. Cl.[4] ...................... G06F 13/00; G08B 23/00
[52] U.S. Cl. .............................. 364/424.01; 364/925; 364/920; 364/424.04; 360/5; 360/6; 346/33 D
[58] Field of Search ............... 364/424, 900, 425, 442, 364/431.12; 360/5, 6; 340/52 F, 870.16, 52 R, 53; 377/15, 16

[56] References Cited

U.S. PATENT DOCUMENTS

| | | | |
|---|---|---|---|
| 3,099,817 | 7/1963 | Kendall | 364/424 |
| 3,792,445 | 2/1974 | Bucks et al. | 73/117.3 |
| 4,072,850 | 2/1978 | McGlynn | 340/52 F |
| 4,258,421 | 3/1981 | Juhasz et al. | 364/424 |
| 4,395,624 | 7/1983 | Wartski | 364/424 |
| 4,595,932 | 6/1986 | Ruhl | 346/33 D |
| 4,608,638 | 8/1986 | Tsikos | 364/424 |
| 4,644,368 | 2/1987 | Mutz | 364/424 |

OTHER PUBLICATIONS

The Truck of The Future, "High Technology", Jun. 1985, pp. 28–33.

Primary Examiner—Felix D. Gruber
Assistant Examiner—Ellis B. Ramirez
Attorney, Agent, or Firm—John Robert Hanway

[57] ABSTRACT

Apparatus and method for logging data corresponding to the motion of a vehicle. Programmable variables in the logger are set when it is connected to a remote indicating device. The logger is then installed in the vehicle and connected to power and motion sensor lines. The logger monitors electrical signals from the motion sensor and determines the relative speed of the vehicle. Information is stored in the memory of the logger for each stop of the vehicle. Such information may include the maximum speed since the last stop, the distance, date, and time the maximum speed occurred, and the distance, date, time, and duration of the stop and any short intermediate stops. The logger contains circuitry for merging together information data groups for each stop in the memory, thereby allowing the longest stops to define the boundaries of the data information groups. After the information is stored in memory, the logger may be removed from the vehicle and reconnected to the remote indicating device for transfer of the memory data and for displaying or printing of the processed data.

19 Claims, 4 Drawing Sheets

VEHICLE MOTION LOGGER

BACKGROUND OF THE INVENTION

This invention relates, in general, to vehicle motion measuring apparatus and, more specifically, to electronic logging of vehicle motion variables.

The acquiring of vehicle motion information can be useful for various vehicle users, including fleet operators, public service and common carrier companies, travelling business and sales people, and private individuals. These and other organizations and drivers can use vehicle motion information for the purposes of maintenance, scheduling, driver supervision, route analysis, tax records, and for other reasons. In order to make efficient use of this information, it must be permanently logged for later analysis and/or processing.

Most conventional vehicle motion measuring devices calculate certain quantities, such as speed, elapsed time, and elapsed mileage, and displays the values of these quantities in real time displays located in the vehicle. While suitable for the intended application, these conventional devices usually lack information about any vehicle stops. As a result, conventional devices cannot be used to determine enough details about the operation and movement of the vehicle to be useful in most analysis situations. Therefore, it is desirable, and it is an object of this invention, to provide vehicle motion logging apparatus which is constructed and operated to preserve motion information which can be indictive, for analysis purposes, of the overall motion of the vehicle rather than reporting motion variables just as they occur.

SUMMARY OF THE INVENTION

There is disclosed herein new and useful devices and a method for logging information about the motion of a vehicle. The logger includes a speed sensor and a real-time clock. Signals from the speed sensor are monitored for determining when the vehicle is stopped, when it is moving, and the speed at which it is moving at a particular instant of time. The speed data is processed to determine the distance travelled to each stop location of the vehicle, the date, time, and duration of the stops, and the maximum speed of the vehicle between stops. The processed data is classified into groups of data between successive stops of the vehicle and saved in a battery-backed CMOS memory. If and when the memory becomes full with stop data groups, the logger merges data corresponding to the shortest stop into the next stop to make data space available in the memory for another, and longer, stop.

The logger is programmed with certain operating variables from an external device before being connected to power and to a sensor in the vehicle. The variables can include information to set the real-time clock, the length of time the vehicle must be moving before a stop is recognized, and the maximum number of stops held by the memory before merging needs to occur. Once the data has been saved in memory, the device is removed from the vehicle and connected to a calculating and indicating device to which the memory data is transferred. From this data, the device can calculate and indicate, print, or display various quantities indicative of the operation and motion of the vehicle which occurred after the logger was first installed in the vehicle.

Auxiliary circuits are used to determine if and when the logger was disconnected from the electrical system in the vehicle. This information is also stored in the memory for later recall to indicate that the stored motion data may be incomplete. Another auxilliary circuit powers-down most of the circuitry when the vehicle is stopped, thereby conserving power and reducing vehicle battery drain. When the vehicle motion resumes, the circuitry reconnects the entire logging apparatus to the power source.

DESCRIPTION OF THE DRAWINGS

Further advantages and uses of this invention will become more apparent when considered in view of the following detailed description and drawings, in which.

DESCRIPTION OF THE PREFERRED EMBODIMENTS

Throughout the following description, similar reference characters refer to similar elements or members in all of the figures of the drawings.

Figure 1:
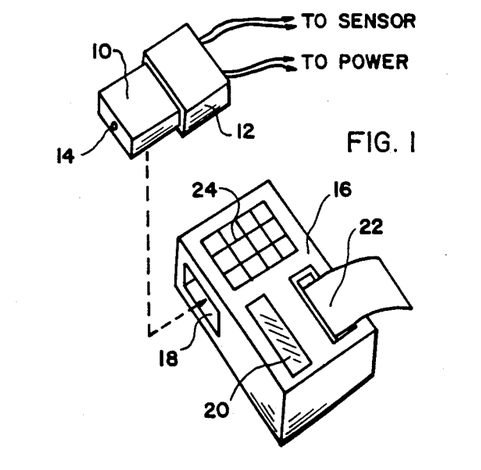
FIG. 1 is a view illustrating the physical layout of the equipment used by this invention.

Referring now to the drawings, and to FIG. 1 in particular, there is shown a physical embodiment which may be used to implement the invention. The logger 10 is contained within an enclosure which may be inserted into the receptacle 12 which would normally be permanently mounted at a convenient location within the vehicle. Contacts on the logger 10 mate with connector contacts in the receptacle 12 so that the logger 10 is connected to the sensor and power wiring permanently installed in the vehicle. An indicating light or LED 14 is provided on the logger 10 as an indication of its proper connection and functioning. According to this specific embodiment, the LED 14 is turned on by the circuitry of the logger when the vehicle is in motion.

FIG. 1 also indicates a calculating and indicating device 16 which would normally be installed at a fixed location somewhere other than in the vehicle. The calculating and indicating device 16 includes an opening 18 into which the logger 10 may be inserted. In normal operation, the logger 10 would first be inserted into the calculating and indicating device 16 and initially programmed before it is inserted into the receptacle 12 which is installed in the vehicle. Then, after the accumulation of motion data by the logger 10 over a period of time, the logger 10 is removed from the vehicle and deprogrammed, that is, the contents of its memory is transferred to the calculating and indicating device 16. Processing then occurs within the calculating and indicating device 16 to arrange the data from the logger 10 into various forms for display on the alphanumeric display 20, or for printing on the printer 22. The key pad is used in the process of programming and deprogramming the logger, mainly for changing the parameters or variables which may be programmed into the logger 10, and for controlling the operation of the device 16.

Figure 2:
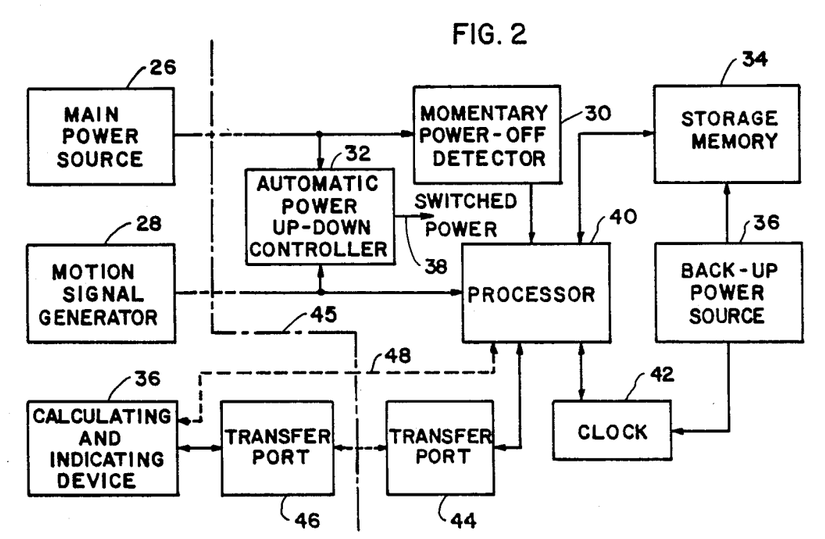
FIG. 2 is a block diagram illustrating the electrical circuit functions of the motion logging system.

FIG. 2 is a block diagram illustrating the circuits or devices which make up the logger, and the external devices to which the logger may be connected. The main power source 26 provides power to the logger when it is installed in the vehicle. Normally, the main power source 26 would be provided by the electrical system of the vehicle. The motion signal generator 28 provides an electrical signal which is used by the logger to determine whether the vehicle is in motion or is stopped, and to determine the speed of the vehicle. A convenient way to provide such a speed responsive electrical signal is by use of permanent magnets attached to a rotating object in the vehicle and positioned for inducing voltage in a pickup coil.

The logger also includes a momentary power-off detector 30 and an automatic power up-down controller 32. The momentary power-off detector 30 provides a means for the logger to identify situations in which the logger has been removed from its power source. In other words, in order to indicate that the logger may not contain complete information regarding the motion of the vehicle because it was prematurely removed from power, either intentionally or accidentally, the power-off detector 30 stores a known digital quantity in the memory 34 of the logger. This quantity, or flag, will later be detected by the calculating and indicating device 16 and the appropriate indication will be given. The particular signal given by the power-off detector 30 may be no more than a particular logic level which is to be stored in the memory 34. For example, a particular bit may be stored at a logic 1 level if the power has been interrupted, and at a logic 0 level if the power has not been interrupted. Since the storage memory 34 is backed-up by the back-up power source 36 during the transfer of the logger between the vehicle and the calculating and indicating device, the power-off detector bit will retain its stored logic value.

The automatic power up-down controller 32 provides a means for the logger to power down portions of its circuitry during times of prolonged stops of the vehicle. This is done to reduce the power consumption of the logger and, ultimately, the drain on the power source, or vehicle battery, which is providing the power. Although this is considered an advantageous feature of the invention, especially when used with vehicles which might have stop periods in excess of several days, it is also contemplated that the circuitry of the logger may be comprised mostly of CMOS or other low power consumption devices, thereby making the total power consumption nominal considering the available power, thereby reducing the need for the power up-down controller 32. The switched power output 38 of the controller 32 would be connected to basically all of the logger circuits except the automatic power up-down controller 32, which must still be connected to the main power source 26 even when the remainder of the logger is powered down.

The majority of the logger functions are performed in the processor 40, as shown in FIG. 2. The processor monitors the electrical signals from the generator 28 and determines when the vehicle is moving or not moving, and the speed at which it is moving. Data corresponding to this motion information is processed and stored in the storage memory 34. Some of this data contains information concerning the date and time of particular happenings, such as the time and duration of a particular stop. This information is provided to the processor with the aid of the clock 42, which may be a real-time clock operating independently of the processor 40. Various other information regarding the motion of the vehicle can be determined by the processor 40 from the available data, such as the speed of the vehicle, the maximum speed between stops, the distance travelled between stops, the distance travelled to any maximum speed measurements, the speed of the vehicle most frequently maintained, and so forth.

The new information which is measured and determined during the operation of the logger is stored in the storage memory 34. In order to utilize this stored information, it must be further processed, calculated, and indicated on some device available to the observer. Although this may all be contained within the same logging device which is connected into the vehicle, it may be advantageous to maintain such peripheral equipment and functions outside of the vehicle and at a permanent location. The dashed lines shown in FIG. 2 indicate the separation of particular functions or circuits of the logger which, according to this specific embodiment, would be provided separate from the basic logging unit. In other word, all of the blocks or functions connected together with solid lines to the right of line 45 would be provided or contained within the basic logging unit. Those remaining functions or devices to the left of line 45 would be contained elsewhere, whether in the vehicle or at a remote location. Dotted line 48 indicates that the calculating and indicating device 36 may be installed directly in the vehicle as part of the logger itself. In such case, the transfer ports 44 and 46 would not be required. However, according to this specific embodiment, the transfer ports are included so that data, available on the bus of the processor 40, can be transferred to a digital processor contained in the calculating and indicating device 36.

Figure 3:
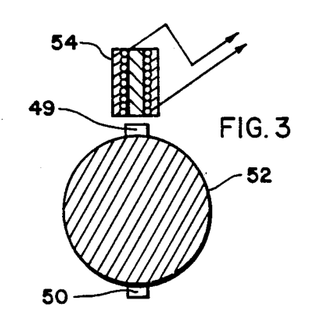
FIG. 3 is a view illustrating a sensor device suitable for use with this invention.

FIG. 3 is a view illustrating a method of providing the electrical signal generated by the motion of the vehicle and used as a sensor signal by the logger to detect and measure motion. Permanent magnets 49 and 50 are positioned or attached to a rotating shaft 52 which, in ordinary installation would be part of the drive shaft or axle of the vehicle. A magnetic pick-up coil 54 is positioned in close proximity to the path of travel of the magnets 49 and 50. As the magnets 49 and 50 pass underneath the coil 54, an alternating voltage is developed in the coil 54 which is transferred to circuitry which converts the alternating voltage into easily used digital values or pulses. A Schmidt trigger circuit providing a high logic level when the generated voltage is above a predetermined amount and a low logic level when it is below a predetermined amount may be used to convert the alternating voltage into easily used binary values. With this arrangement, the speed of the vehicle is determined by measuring or observing the frequency of the square wave signal output of the Schmidt trigger circuit. Other sensor arrangements may be used within the scope of the invention, such as measuring the number of pulses per unit time interval.

Figure 4:
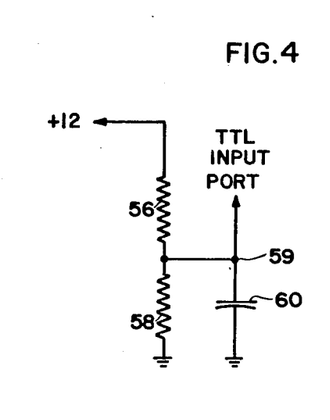
FIG. 4 is a circuit which may be used to detect interruption of power to the vehicle logger.

FIG. 4 is a schematic of a circuit which may be used to provide the momentary power-off detection in the logging device. According to FIG. 4, the main power voltage of 12 volts is divided across the resistors 56 and 58 in such a manner that the resulting voltage would normally produce a high or logic 1 level at terminal 59 when the +12 volts is present. This voltage is also connected to capacitor 60 which reduces the effect of very short power interruptions and which also keeps the TTL logic level at a low state for a short time immediately after power is first applied. Therefore, when the 12 volts is first applied to the circuit after being off mementarily, a low logic level remains across the capacitor 60 for a few seconds. During this initial few seconds, the processor begins to run and looks immediately at the TTL level across capacitor 60. If it is at logic 0, then a suitable bit in the storage memory is changed to indicate that the power has been off.

Figure 5:
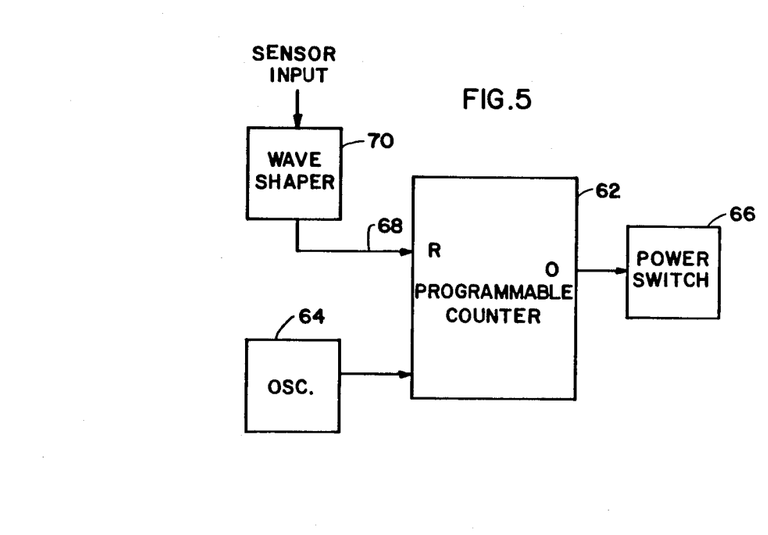
FIG. 5 illustrates, in block form, a circuit which may be used to automatically switch the power supplied to the logger.

FIG. 5 is a block diagram of a circuit which may be used by the logger to provide the automatic power up-down controlling function. The programmable counter 62 is an integrated circuit which continuously counts the cycles produced by the oscillator 64. Upon counting the programmed number of cycles, a logical output is generated to the power switch 66 unless a suitable logic level has been inputted to the reset line 68 of the counter 62. An RCA CA-3006 integrated circuit provides the functions of such a programmable counter. The sensor input is passed through a wave shaper 70 before being applied to the reset input of the counter 62.

Under normal conditions of frequent sensor inputs, that is, when the vehicle is in motion, the programmable counter 62 is frequently reset. Thus, the counter never reaches the point at which a signal is outputted to the power switch 66, thus, the power switch 66 remains in the ON condition. However, whenever the vehicle is stopped and the sensor input is not present, the absence of a reset pulse to the programmable counter 62 will eventually allow the output to change state and turn off the power switch 66. When this happens, power is only being supplied to the portions of the logger circuit which need to be powered to maintain the functions shown in FIG. 5. Once the vehicle starts moving, a reset signal to the counter 62 will cause the power switch 66 to be turned ON again which will allow the logger to function normally while the vehicle is moving.

Figure 6:
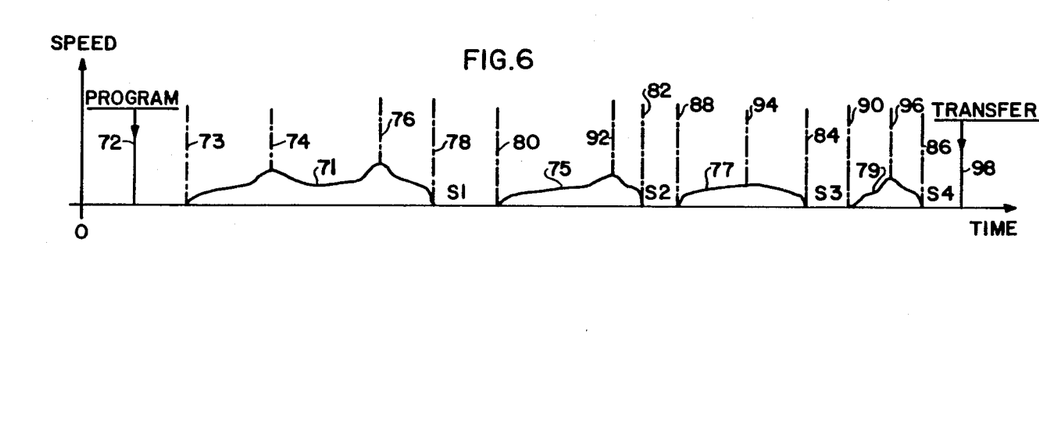
FIG. 6 is a diagram illustrating the times at which various quantities are measured by the vehicle motion system.

FIG. 6 is a graph illustrating, with respect to time and the speed of the vehicle, the measurement and accomplishment of certain functions of the logger. According to FIG. 6, the logger is first programmed, as shown by line 72, before being installed into the vehicle. The programming allows certain variables in the logger to be set without the need for apparatus on the logger itself to enter such data. It is an object of this embodiment of the invention to keep the logger as simple and inexpensive as possible and to maintain any additional equipment or functions which may be used with similar loggers in a common piece of equipment at a remote location. The quantities or parameters which may be programmed into the logger include the length of time with which the vehicle must be stopped before a stop is recognized, the number of total stops which will be processed by the logger independently of each other, time and date data for initially setting the real-time clock in the logger, and other required and desired values.

Assuming that the logger has been programmed and has been removed from the programming device and inserted into the receptacle in the vehicle, it will be connected to the speed sensor and to the power source provided by the vehicle. Because the logger's processor includes a power-on-reset feature, the logger is operating and looking for indications that the vehicle has started to move, such indications being electrical signal changes from the speed sensor. Curves 71, 75, 77 and 79 illustrate the speed of the vehicle during the time indicated. At location 73, the logger detects a beginning of movement of the vehicle. At that time, the logger will store into memory the date and time that the vehicle started moving for later use by the indicating and calculating device. Subsequent to the starting of movement, the logger continuously monitors the speed of the vehicle to determine a maximum speed. The first maximum speed 74 is produced when the speed of the vehicle begins to decrease, just past line 74. The logger records the value of the maximum speed, the date and time of the maximum speed, and the distance travelled to the point where the maximum speed was measured. This data is stored in the battery backed memory of the logger. As the vehicle continues to move, a new maximum speed 76 is produced since the speed at that point is higher than the maximum speed 74. Therefore, the data in the memory is updated or changed to indicate the distance, date, time, and speed of the maximum speed 76. The distance data recorded in the logger is actually a pulse count corresponding to the total pulses counted by the logger up to that point. A conversion factor is used in the remote processor to convert the count to distance. The conversion factor is dependent upon the location and manner in which the sensor is installed in the vehicle. It may be contained in the memory of the logger or manually loaded into the remote calculating and indicating device.

The vehicle next decreases speed and comes to a stop 78. After a period of time, the vehicle starts 80, thereby providing the first complete stop of the vehicle for which the data is classified. In other words, all of the desired information between the vehicle starts 73 and 80 is included in one data group stored in the memory of the logger. This data group includes information as to the duration of the stop, the data and time of the stop, as well as the information regarding the maximum speed of the vehicle. Since the restart time is also logged, the length of time the vehicle was moving is also available.

Similar data gathering intervals occur during further motion changes of the vehicle. For example, additional stops 82, 84 and 86 are logged in the logger's memory, along with restarts 88 and 90. New maximum speed loggings are made for each interval between stops of the vehicle, such as maximum speeds 92, 94 and 96. After all of the information corresponding to the motion of the vehicle has been accumulated, the logger is removed from the vehicle and taken to the calculating and indicating device which causes a transfer to be made between the memory in the logger and the memory in the indicating device, as shown by line 98. Once the logged information is contained within the calculating and indicating device, various methods of calculating and displaying the information can be used. The format of the display can also be varied depending upon the interests of the person analyzing the motion data and, of course, the motion data can be analyzed automatically by the processing device for certain types of information.

The recording or storing of data in the memory of the logger is accomplished by dividing the data into groups corresponding to the stops of the vehicle. A convenient way to accomplish this is to assign specific memory locations to particular measurement quantities, such as mileage (pulse counts), duration, date, time, speed units, etc. Table 1 indicates an arrangement of data which may be used for a data group in the memory of the logger.

TABLE 1

| MEMORY LOCATION | DATA GROUP CONTENTS |
|---|---|
| 1 | Mileage of Stop |
| 2 | Duration of stop |
| 3 | Date and time of stop |
| 4 | Duration of intermediate stops |
| 5 | No. of intermediate stops |
| 6 | Mileage of maximum speed |
| 7 | Units of maximum speed |
| 8 | Date and time of maximum speed |
| . | . |
| . | . |
| . | . |
| N | |

As shown in Table 1, each quantity classified into the data group resides in a different memory location. It is emphasized that some quantities may take more than one memory location to store the complete quantity, although only one location is shown in Table 1 for simplicity. Also shown in Table 1 is space for N memory locations to store other information which may be desired about the motion of the vehicle between the stops, such as maximum acceleration or deceleration and most frequently maintained speed. The maximum speed data would, at this point, be recorded as a pulse rate, and represents the relative speed of the vehicle before being converted to miles per hour (MPH) by a conversion factor.

Table 1 also includes information or data regarding the number of intermediate stops and the total duration of the intermediate stops. Intermediate stops are those stops which are included in the memory data groups of the logger in order to make efficient use of the memory. In other words, since the memory of the logger has a finite size, or number of locations, it is not always possible or desirable to provide a separate slot or data group for each stop of the vehicle, especially when many of the stops may be for very short time periods. Such data is not useful or meaningful, and can be distracting to the motion information derived from the vehicle data.

This invention classifies the data in such a manner that the memory is divided into data groups corresponding to the longest stops of the vehicle. Therefore, shorter stops are counted as intermediate stops between two longer stops. For example, as shown in FIG. 6, the total number of stops, including the final stop, is four, which are denoted as stops S1, S2, S3 and S4. However, if the memory only had enough space to store data groups corresponding to three memory stops, one of the memory stops would be included as an intermediate stop. By way of example, the shortest stop S2 would be included as an intermediate stop in the data group or memory slot occupied by the information corresponding to the stop S3.

Table 2 illustrates the type of actual data which may be stored in consecutive memory slots of the logger's memory.

TABLE 2

| MEMORY LOCATION | CONTENTS |
|---|---|
| 1 | 0 |
| 2 | 0 |
| 3 | 2-9; 5:00 PM |
| 4 | 0 |
| 5 | 0 |
| 6 | 1 |
| 7 | 46 |
| 8 | 2-9; 5:04 PM |
| 9 | 2 |
| 10 | 10 MIN |
| 11 | 2-9; 5:07 PM |
| 12 | 1 |
| 13 | 2 |
| 14 | 6 |
| 15 | 52 |
| 16 | 2-9; 5:27 PM |
| 17 | 9 |
| 18 | 14 HRS 35 MIN |
| 19 | 2-9; 5:31 PM |
| 20 | 2 |
| 21 | 1 |
| 22 | 20 |
| 23 | 51 |
| 24 | 2-10; 8:29 AM |
| . | . |
| . | . |
| . | . |
| N | |

The 24 memory locations illustrated are divided or classified into three data groups each containing eight memory locations. The contents of each location is indicated by the quantities next to the memory location numbers. These quantities are indicated in decimal values even though actual memory location values would have the information converted into binary digital values representing dates, times, and pulses.

The first data group, consisting of memory locations 1 through 8, is unique in that it does not contain any values for the mileage and duration of the stop. This is because this data group represents the initial start of the vehicle after the logger has been installed therein. The remaining data groups each contain values for the duration and mileage of their respective stops. Normally, the memory size of the logger would permit many more stop data groups to be included in the memory than the two stop data groups and the one initial start data group shown in Table 2. A working embodiment of the invention has been constructed and operated which contains enough memory to classify motion information of the vehicle into groups divided by thirty predominant or long stops of the vehicle, with many additional intermediate stops being capable of being registered.

Table 3 illustrates a conventional readout which may be printed or displayed based upon the information from a vehicle logger memory corresponding to the information in Table 2.

TABLE 3

| MILEAGE | DATE | TIME | QUANTITY | DESCRIPTION |
|---|---|---|---|---|
| 0 | 2-9 | 5:00 PM | — | STARTED MOVING |
| 1 | 2-9 | 5:04 PM | 46 MPH | MAX. SPEED |
| 2 | 2-9 | 5:07 PM | — | STOPPED |

TABLE 3-continued

| MILEAGE | DATE | TIME | QUANTITY | DESCRIPTION |
| --- | --- | --- | --- | --- |
| 2 | 2-9 | 5:17 PM | 10 MIN | DURATION OF STOP |
| — | — | — | 1 MIN | DURATION OF 2 INT. STOPS |
| 6 | 2-9 | 5:27 PM | 52 MPH | MAX. SPEED |
| 9 | 2-9 | 5:31 PM | — | STOPPED |
| 9 | 2-10 | 8:06 AM | 14 HRS 35 MIN | DURATIOM OF STOP |
| — | — | — | 2 MIN | DURATION OF 1 INT. STOP |
| 20 | 2-10 | 8:29 AM | 51 MPH | MAX. SPEED |
| 35 | 2-10 | 8:47 AM | — | STOPPED |

As can be seen from Table 3, the data can be displayed in order of increasing mileage, with various quantities, such as intermediate stops and maximum speed, being displayed relative to each stop of the vehicle. This type of data can be used for analysis of the operation and movement of the vehicle. It is again emphasized that, with the data available from the logger, various other display or printing formats may be used within the contemplation of this invention.

As previously indicated, it is not possible to store information about the motion of the vehicle corresponding to each stop of the vehicle unless the vehicle only makes a few stops before the information is downloaded and analyzed. Since memory space is limited in most all applications, it is necessary to convert some of the shorter stops into intermediate stops. Table 4 illustrates the merging of a shorter stop into a longer stop to accomplish this result.

TABLE 4

| MEMORY LOCATION | CONTENT |
| --- | --- |
| 1 | 0 |
| 2 | 0 |
| 3 | 2-9; 5:00 PM |
| 4 | 0 |
| 5 | 0 |
| 6 | 1 |
| 7 | 46 |
| 8 | 2-9; 5:04 PM |
| 9 | 9 |
| 10 | 14 HRS 35 MIN |
| 11 | 2-9; 5:31 PM |
| 12 | 13 MIN |
| 13 | 4 |
| 14 | 6 |
| 15 | 52 |
| 16 | 2-9; 5:27 PM |
| . | . |
| . | . |
| N | |

As can be seen from Table 4, the second data group, which resides in memory locations 9 through 16, is a combination of the memory locations 9 through 24 of Table 2. The maximum speed shown in Table 4 is from the first of these data groups in Table 2 since its speed of 52 MPH is greater than the 51 MPH in the next data group. The four intermediate stops logged in the second data group of Table 4 comprise the two intermediate groups from memory location 13 of Table 2, the one intermediate group from location 21 of Table 2, and the stop represented by the data group contained in memory locations 9 through 16. The total time of the intermediate stops, 13 minutes, is the total of the 3 minutes of intermediate stops from Table 2 and the 10 minutes of the shorter stop which was merged together from Table 2. Since the first data group residing in memory locations 1 through 8 of Table 2 contains information on the initial start of the vehicle, it is not used or considered in selecting the shortest stop during the merging process.

Figure 7:
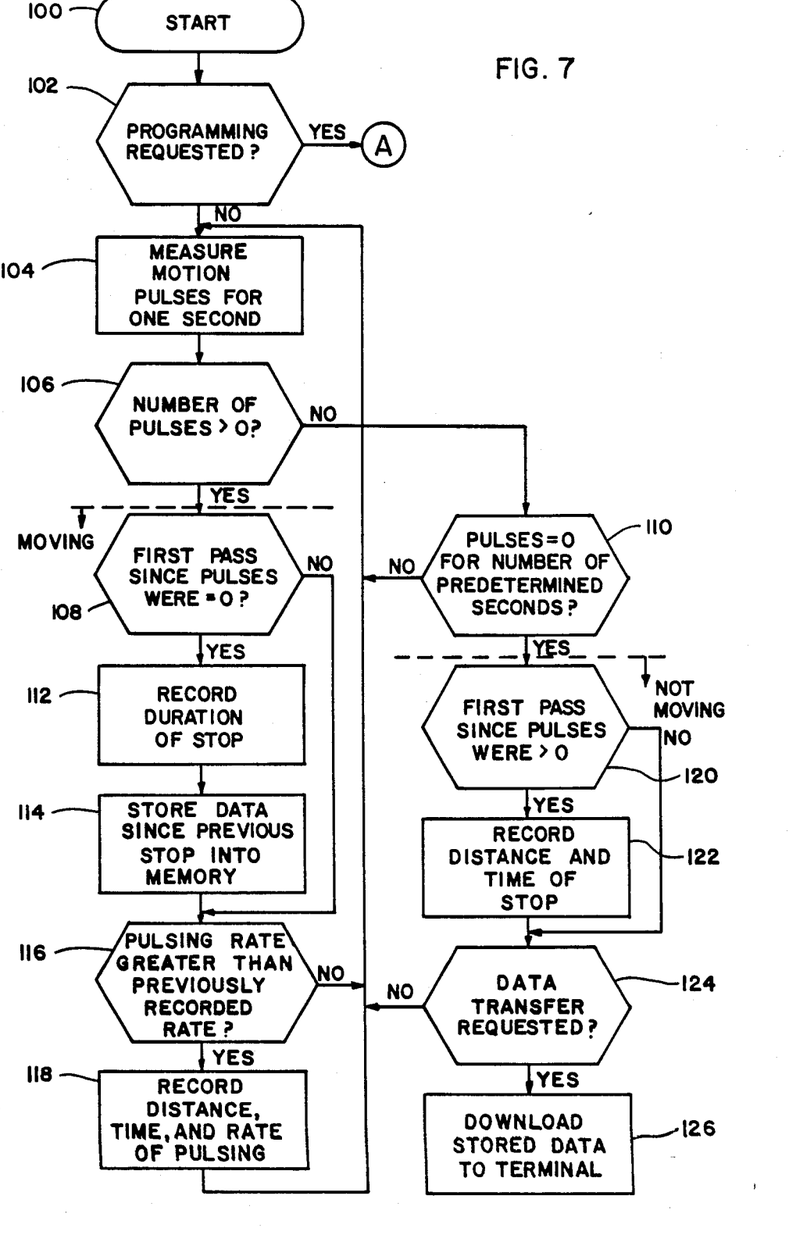
FIG. 7 is a flow chart illustrating a program which can be used in the logger to provide the desired functions of the invention.

FIG. 7 is a flow chart illustrating the steps performed by the processor of the logger in monitoring, manipulating, storing, and transferring data. The start 100 of the processing steps is activated by the power-on-reset feature of the processing circuitry. The logger next determines whether it is to be sent programming information, as shown by decision block 102. This would normally occur when the logger has been inserted into the remote calculating and indicating device before installation in the vehicle. If such is the case, the program sequence is transferred to the programming flow chart illustrated in FIG. 8, which will be described later. Programming may be requested through data ports by holding a particular line in a specified logic state. If this state is not seen by the logger upon initial power-up, control is transferred to block 104 instead of receiving the programming instructions.

When already programmed and installed in the vehicle for the firs time, a starting of the processor would normally move execution to block 104. According to block 104, the electrical signals from the motion sensor are measured for one second, with the one second time period determined by the real-time clock of the logger. Once measured, the number of pulses are analyzed to determine if they are greater than zero, as shown by block 106. If greater than zero, which indicates that the vehicle is moving, processing passes to block 108. If not greater than zero, processing passes to block 110. Assuming, for simplicity of explanation, that the vehicle is moving, control or processing passes to block 108 where a determination is made whether the programming has reached this point for the first time since the vehicle started moving. If that is the case, processing proceeds to block 112, which means that the vehicle has just started moving. According to block 112, the duration of the immediately preceeding stop is recorded in the memory of the logger. Since the stop signifies the point at which the motion data is to be classified and, since the previous motion of the vehicle, other information has been logged into temporary memory of the processor, block 114 transfers all of the motion information between the most recent stop and the stop before that to the battery backed memory of the logger. In the event that the memory of the logger is completely filled, merging of previous stop data groups must be accomplished before the most recent data is put into the memory. Thus, additional steps in storing the memory, as indicated by block 114, are performed in such instances, and will be described in more detail in connection with FIG. 9.

Once the stop data has been stored in memory, the logger determines whether the number of pulses measured during the one second interval is greater than any other previously recorded pulse rate since the last stop. The first time through block 116 would yield a "yes" decision and pass program control to block 118 which records the distance, time, and rate of the pulsing (speed) into temporary memory. After such recording, program execution is transferred back to block 104. Upon further proceeding of the program execution through block 116, a "no" decision may be made whenever the pulsing rate is not higher than the previously recorded rate, and program execution is also returned back to block 104, but without changing the recorded pulse (speed) rate. Therefore, while the vehicle is still in motion, the programming process loops through steps including blocks 104, 106, 108 and 116, and through block 118 if a higher or greater pulsing rate is measured.

Whenever the number of pulses is equal to zero, as determined by block 106, program execution is transferred to block 110. In order to allow the logger to disregard relatively short stops, with this quantity being programmable into the logger, block 110 returns the program to block 104 unless the predetermined time has been equaled. For example, if the logger was originally programmed to disregard stops with durations under thirty seconds, a stop must be at least thirty seconds long before program execution is transferred to block 120. When transferred to block 120 for the first time since the vehicle was moving, that is, for the first pass after being stopped, program execution is transferred to block 122. According to block 122, the distance, date, and time of the stop is recorded into temporary memory for later transfer into the battery backed memory of the logger. Block 124 determines whether data is to be transferred from the logger to the calculating and indicating device, and if such is determined in the affirmative, control is transferred to block 126 for the downloading operation. Otherwise, control is routed back to block 104. Such a data transfer would be requested, normally, only when the logger has been removed from the vehicle and installed or connected to the remote terminal or calculating and indicating device. Therefore, during a stop of the vehicle, the program shown in FIG. 7 executes a loop through blocks 104, 106, 110, 120 and 124.

The temporary memory used by the processor does not necessarily require battery back-up, since the data therein is not required to be preserved until it is transferred to the battery backed memory. As such, the temporary memory may be a memory device or section separate from the battery backed memory, though a portion of the battery backed memory may be used since battery back-up does not prevent its use.

Figure 8:
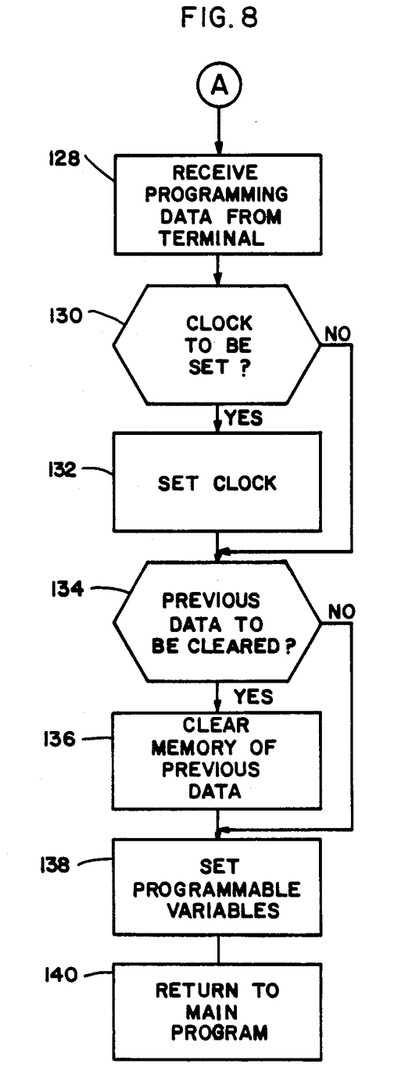
FIG. 8 is a flow chart of a subroutine used by the program of FIG. 7.

FIG. 8 is a flow chart illustrating the steps performed by the logger's processor when initially programmed by the remote data terminal, or the calculating and indicating device. As shown in block 128, appropriate data, flag, and handshake signals are transferred between the two devices to send that data from the terminal to the logging device. This data is then looked at by the logger, as indicated in block 130, to determine whether the clock must be set. If so, the clock is set according to block 132. After that, or if it is not to be set, control is transferred to block 134. Setting of the clock usually involves writing a series of date and time words to the clock device as described in the manufacturer's specification sheet for such device. If the memory in the logger is to be preserved, control is transferred to block 138, otherwise control is transferred to block 136. In other words, the programming of the logger may make it possible for data already in the logger to be preserved and added to by subsequent motion information of the vehicle. This would be used in cases when it is necessary or desirable to have intermediate readouts of the vehicle motion data without erasing that data for the complete trip. Once the information is in the logger, the programming variables are set and the control is transferred back to the main program as shown by block 140.

Figure 9:
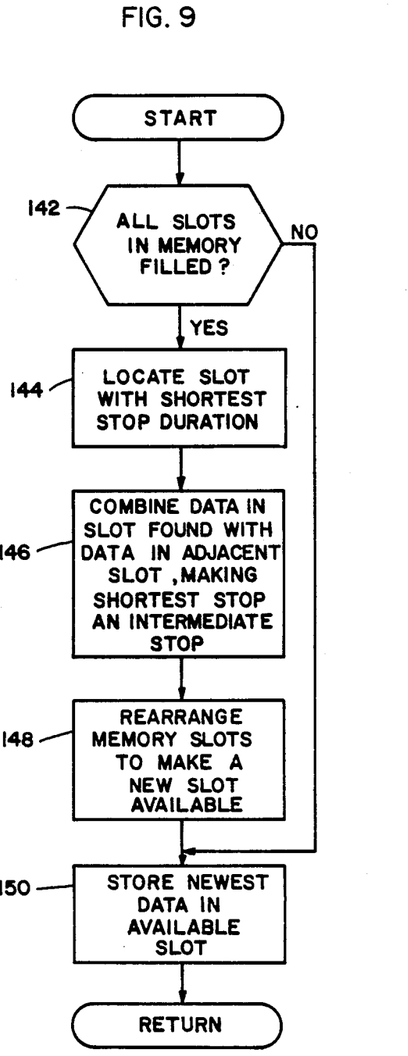
FIG. 9 is a flow chart of another subroutine which is used by the main program shown in FIG. 7.

FIG. 9 is a flow chart illustrating the processing steps which may be used to merge data in the memory of the logger, as required sometimes by the block 114 of FIG. 7. It is emphasized that, once merging has become necessary, it will be required every time data is transferred from temporary storage into the battery backed memory of the logger. This is because the memory has been completely filled and additional stops make it necessary to merge stops together to make room for additional stop data.

As shown in block 142 of FIG. 9, a determination is first made as to whether all of the memory slots or data groups have been filled. If not, program execution is immediately transferred to block 150 and the data is transferred without any merging. If all of the slots are filled, processing proceeds though blocks 144, 146 and 148 before reaching block 150 and returning to the main program. As stated in blocks 144, 146 and 148, the slot of shortest duration is determined and combined with the next subsequent slot to make space available for the current data group or slot.

There has been disclosed herein a new and useful vehicle motion logger which conveniently and ecomonically monitors and preserves data concerning the motion of the vehicle. The logger is uniquely constructed in a manner which permits a minimum amount of components to be transferred between the vehicle and the remote apparatus which reads and processes the stored motion information. It is emphasize that other component groupings may be used without departing from the teachings of the invention. For example, it is possible to arrange the components in such a manner that only the memory containing the vehicle motion data needs to be transferred from the vehicle to the processing apparatus. On the other hand, it is possible, and within the contemplation of this invention, that the indicating and/or printing components may be an integral part of the logger and installed in the vehicle. It is also emphasized that all of the matter contained in the foregoing description, or shown on the accompanying drawings, is intended to be interpreted as illustrative rather than limiting.

I claim as my invention:

1. Vehicle motion logging apparatus comprising:
   means for acquiring electrical information responsive to the motion of the vehicle;
   means for classifying said information into a plurality of groups of data, with each group containing data about the motion of the vehicle which occurred between at least two stops of the vehicle;
   memory means for storing data for later retrieval;
   means for placing a plurality of said classified data groups into said memory means; and
   means for merging together groups of classified data contained in said memory means, with said merging placing a group of data corresponding to a particular stop into the data of another group which corresponds to a stop of duration which is longer than said particular stop;
   said merging of data dividing the memory means into data groups corresponding to the longest stops of the vehicle.

2. The vehicle motion logging apparatus of claim 1 including:

means for calculating motion dependent quantities from the information contained in said classified data groups, said means being located within the same enclosure as said classified means; and means for indicating said motion dependent quantities.

3. The vehicle motion logging apparatus of claim 1 wherein the memory means has a capacity to store a predetermined maximum number of data groups, and wherein only the longest stops of the vehicle are included in separate data groups.

4. The vehicle motion logging apparatus of claim 1 including means for detecting and storing in the memory means when the apparatus has been separated from its power source.

5. The vehicle motion logging apparatus of claim 1 including:

means for powering-down part of the apparatus circuitry when the vehicle has not been in motion for a predetermined time period; and means for powering-up said part of the apparatus circuitry when the vehicle starts moving.

6. The vehicle motion logging apparatus of claim 1 wherein said information about the motion of the vehicle includes the relative distance, duration, date, and time of the second stop.

7. The vehicle motion logging apparatus of claim 1 wherein said information about the motion of the vehicle includes the relative maximum speed at which the vehicle travelled between said two stops, and the relative mileage, date, and time said maximum speed occurred.

8. The vehicle motion logging apparatus of claim 1 wherein said information about the motion of the vehicle includes the total time duration of all intermediate stops.

9. The vehicle motion logging apparatus of claim 1 including:

means for calculating and indicating motion dependent quantities from the information contained in said classified data groups, said means being remotely located from said classified means when it is functioning to classify said information; and means for transferring said classified data groups to said calculating and indicating means.

10. The vehicle motion logging apparatus of claim 9 wherein said means for transferring includes input and output ports connectable to permit the transfer of logic levels to said calculating and indicating means.

11. Vehicle motion logging apparatus comprising:

sensor means for acquiring an electrical signal responsive to the motion of the vehicle;

clock means for providing date and time data;

means for determining, from said sensor and clock means, motion data representative of the relative distance travelled and the date, time, and duration of vehicle stops;

memory means for storing data for later retrieval;

means for classifying said motion data into data groups and for storing said motion information which occurred between and during vehicle stops;

means for merging data groups together in the memory means, with the merging modifying the data group originally associated with the shortest stop; and means for transferring the stored data to an external device for processing and indicating;

said merging of data dividing the memory means into data groups corresponding to the longest stops of the vehicle.

12. The logging apparatus of claim 11 wherein the classified motion information includes the maximum relative speed between stops.

13. The logging apparatus of claim 11 including means for determining when the apparatus has been separated from its power source.

14. The logging apparatus of claim 11 including means for acquiring programming information from another device, said programming information including time information to set the clock means, the number of stops to be classified without merging motion data between stops, and the length of time the vehicle must be stopped before a stop is registered.

15. A method for logging information about the motion of a vehicle, said method comprising the steps of:

determining if the vehicle is moving or if it is stopped;

acquiring information from a clock counter;

storing data in a memory corresponding to the distance, date, time, and duration of each stop;

merging the data between stops stored in the memory by incorporating the data corresponding to the shortest stop into another stop; and transferring the stored data to a calculating and indicating means;

said merging of data dividing the memory into data groups corresponding to the longest stops of the vehicle.

16. The logging method of claim 15 wherein the stored data also corresponds to the maximum speed of the vehicle between each stop.

17. The logging method of claim 15 including the step of sensing when the power to the apparatus which is used for the logging has been disconnected.

18. The logging method of claim 15 including the step of receiving programming information from an external device, said programming information specifying the length of time the vehicle must not be in motion to be regarded as a stop.

19. Vehicle motion logging apparatus comprising:

sensor means for acquiring an electrical signal responsive to the motion of the vehicle;

clock means for providing date and time data;

means for determining, from said sensor and clock means, motion data representative of the distance travelled, the maximum speed, and the date, time, and duration of vehicle stops;

memory means for storing data for later retrieval;

means for classifying said motion data into data groups and for storing said data groups in said memory means, said data groups containing motion information representative of the mileage, date, time, and duration of a vehicle stop, and the mileage, date, time, and magnitude of the maximum vehicle speed which occurred since the previous stop;

means for merging data groups together in the memory means, with the merging modifying a data group originally associated with the shortest stop and dividing the memory means into data groups corresponding to the longest stops of the vehicle;

means for determining when the apparatus has been separated from its power source and for indicating such a condition in the stored data;

means for transferring the stored data to an external device for processing; and means for acquiring time, number of stops, and minimum stop length programing information from another device.

* * * * *